(No Model.) 2 Sheets—Sheet 1.
J. A. PLOPPER.
NUT TAPPING MACHINE.
No. 589,442. Patented Sept. 7, 1897.
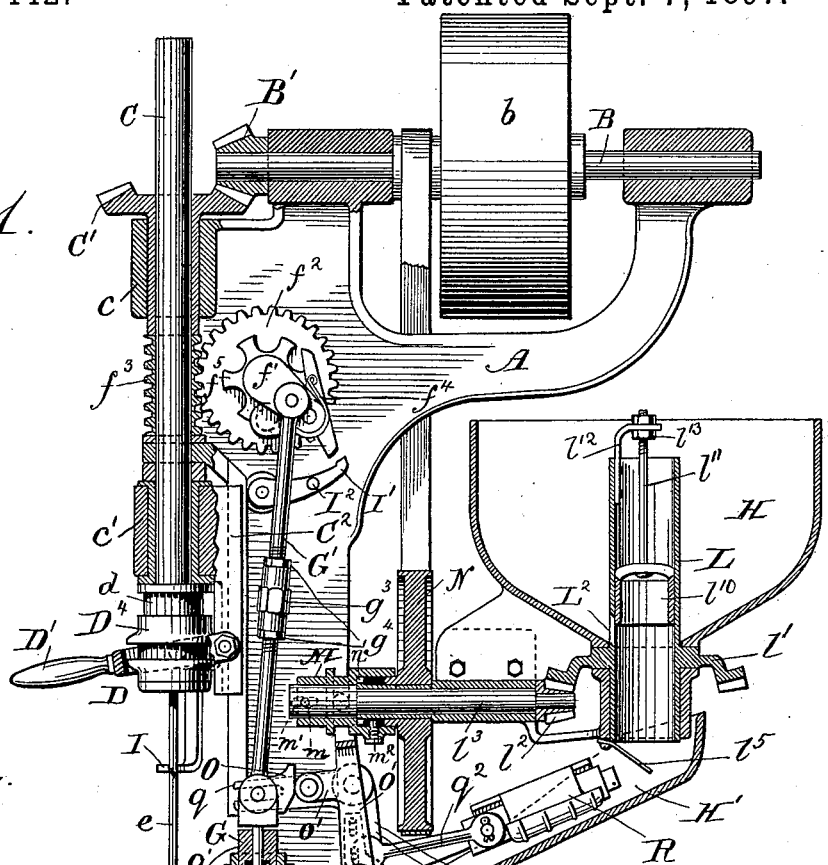
Fig. 1.
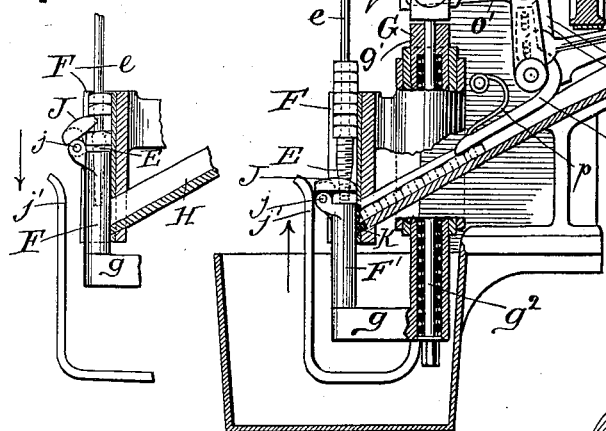
Fig. 2.
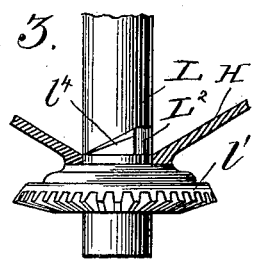
Fig. 3.
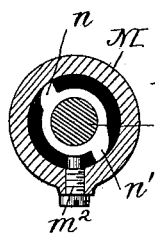
Fig. 4.
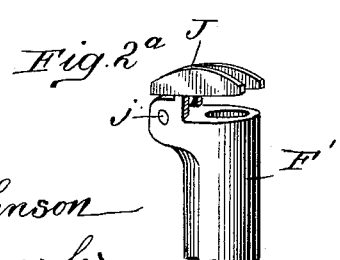
Fig. 2ª.
Witnesses
Arthur Johnson
Louis O. Henszler
Inventor
James A. Plopper (No Model.) 2 Sheets—Sheet 2.

J. A. PLOPPER.
NUT TAPPING MACHINE.

No. 589,442. Patented Sept. 7, 1897.

Witnesses
Arthur Johnson
Louis O. Hensler

Inventor
James A. Plopper

THE NORRIS PETERS CO., PHOTO-LITHO., WASHINGTON, D. C.

UNITED STATES PATENT OFFICE.

JAMES A. PLOPPER, OF CHICAGO, ILLINOIS, ASSIGNOR TO THE DEERING HARVESTER COMPANY, OF SAME PLACE.

NUT-TAPPING MACHINE.

SPECIFICATION forming part of Letters Patent No. 589,442, dated September 7, 1897.

Application filed November 16, 1895. Serial No. 569,145. (No model.)

*To all whom it may concern:*

Be it known that I, JAMES A. PLOPPER, a citizen of the United States, residing at Chicago, in the county of Cook and State of Illinois, have invented certain new and useful Improvements in Nut-Tapping Machines, of which the following is a clear and full description, reference being had to the accompanying drawings, in which—

Figure 5:
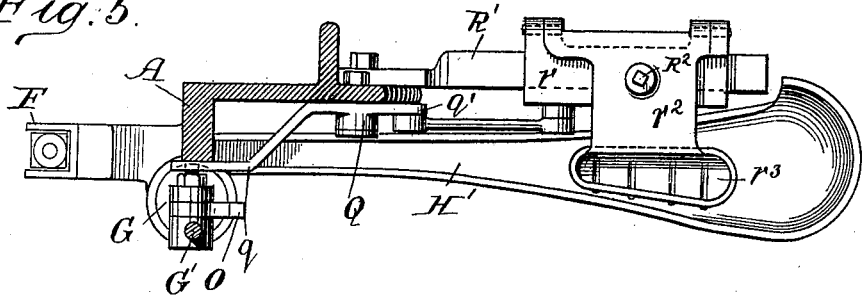
Figure 6:
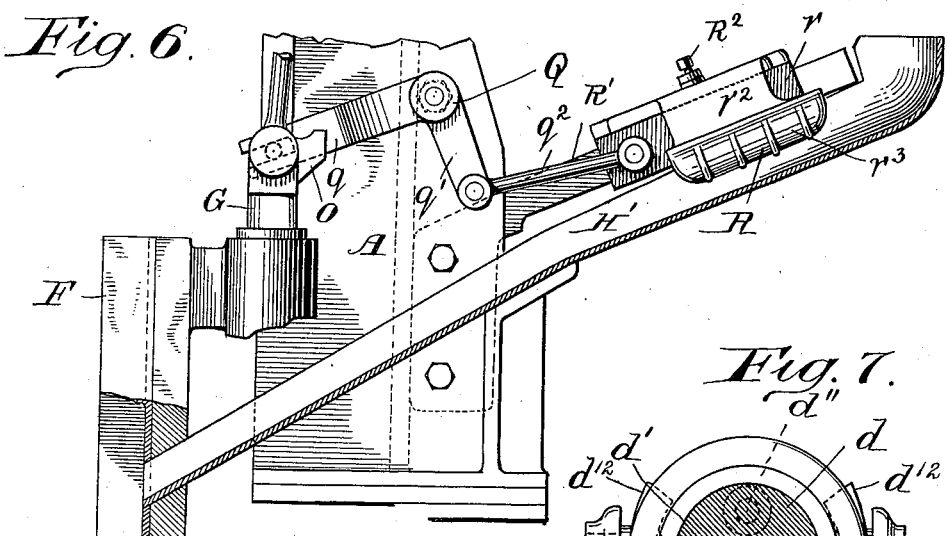
Figure 7:
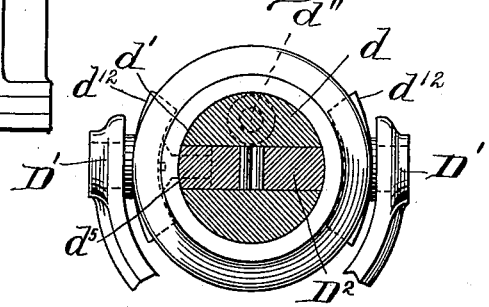
Figure 9:
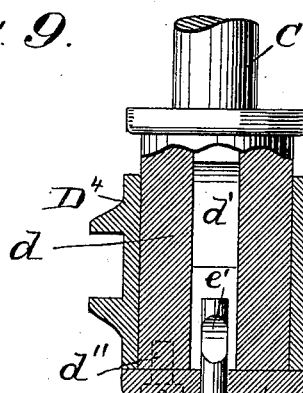
Figure 8:
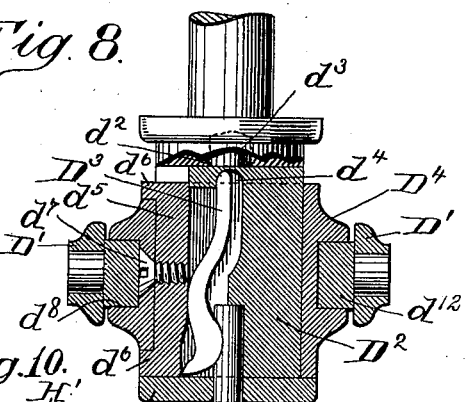
Figure 10:
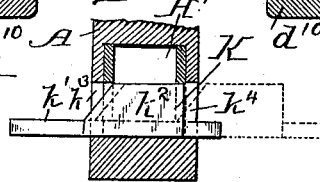

Figure 1 is a side elevation, partly in section. Figs. 2 and 2ª are details of the feeding devices. Fig. 3 is a detail of the hopper. Fig. 4 is a cross-section of the hopper-driving shaft. Figs. 5 and 6 are detail views of the nut-blank-supplying chute. Figs. 7, 8, and 9 are details of the chuck, and Fig. 10 shows a hand-operated gate for the chute.

My invention relates to that class of machines shown, described, and claimed in the patent granted to me May 23, 1893, and numbered 498,186, and my present machine may be considered as an improvement upon the machine shown therein.

In Fig. 1 is illustrated the entire operative mechanism, the old parts of which—that is, the parts shown in the above-mentioned patent—will now be briefly described in order that a proper understanding of the invention that forms the subject-matter of this application may be reached.

A is the frame upon which the different devices that comprise the machine are supported; B, the main shaft, having the pulley $b$, by means of which rotation is transmitted from the line-shaft or prime motor.

B' is a bevel-pinion meshing into a bevel-gear C' upon the tap-spindle C, which tap-spindle is supported in bearings $c$ and $c'$, that $c'$ being as one part with the slide $C^2$ and adapted to be raised and lowered to adjust it to and from the tapping-box to accommodate various lengths of taps. This adjustment can be made by means shown in the patent above referred to or by any convenient means. The gear C' is secured to the shaft by a feather-key, which shaft is adapted to slide therein and at the same time be rotated by the said gear.

D is the tap-chuck, secured to the lower end of the spindle C. The chuck is, generally considered, of substantially the kind shown in the patent above referred to and can be operated in a similar manner by means of the hand-lever D'. It is modified, however, as will be shown hereinafter, which modifications will form the subject-matter of one or more claims.

E is the tap, having a long shank $e$, adapted to be held by the chuck D. It revolves in the tapping-box F, secured to the main frame, which box can be of substantially the shape shown in Fig. 5, so as to hold the nuts from turning while being tapped. Tapping-boxes of different sizes and shapes are used for different kinds and sizes of nuts.

F' is a moving anvil adapted to be reciprocated to and from the tap in order to feed the nuts thereto. It receives its movement by means of a crank $f'$, worm-wheel $f^2$, and a worm $f^3$ from the constantly-revolving tap-spindle. The crank is rotatably supported concentrically with the worm-wheel $f^2$ and adapted to be clutched thereto by a spring-held dog $f^4$, engaging a toothed disk $f^5$ as one part with the said worm-wheel. A plunger G is supported on the main frame and has an arm $g$, to which the anvil is secured. Its upper end is connected to the crank $f'$ by a connecting-rod G'. When the crank $f'$ is connected with the worm-wheel by means of the dog and clutching-disk, the anvil is given a vertical reciprocation to and from the constantly-revolving tap. It is requisite that the anvil in feeding the nut to the tap should be yieldingly sustained, and therefore the plunger G is made elastic in regard to its length by being in three parts—a hollow sleeve $g'$, a rod $g^2$, and a spring located between the two, as shown in Fig. 1. The connecting-rod G is made adjustable in regard to its length in order to adjust the anvil to and from the tap. The means employed is a double nut $g^3$, into which are screwed the two halves of the connecting-rod by means of right and left hand threads and lock-nuts $g^4$.

H is the hopper, and H' the chute. The supply of nuts is promiscuously deposited into the hopper, and is fed from there to the tapping-box down the chute H' in a manner hereinafter described.

As the nuts are tapped they accumulate upon the stem of the tap, and when a number have been tapped they move the bar I, which in turn moves the lever I' into the path of the clutching-dog $f^4$, causing the anvil-moving mechanism to be disconnected from the worm-wheel that gives it motion, and thus stop the feeding of the nuts to the tap. The mechanism employed to connect the bar I with the detent-lever I' may be that employed for the same purpose in the patent above referred to or any convenient means. The detent-lever I' has a handle $I^2$, whereby it can be moved into the path of the dog $f^4$ by hand when required in starting the machine.

As far as described the machine is substantially the same as shown in the previously-mentioned patent, and the improvements which form the subject-matter of this application will now be described.

As the nut-blanks are fed down the chute the lower one is forced by the weight of the succeeding blanks onto the anvil when the said anvil is in its lowest position, and is prevented from being turned over on its side (which occasionally happens) by means of the shuttle J, pivoted to the anvil at $j$. A spring $j'$ presses upon the cam-shaped back of the shuttle J, when the anvil is in its receiving position, with sufficient force to keep it in its proper position upon the anvil, as shown in Fig. $2^a$. When the anvil commences its downward movement, as shown in Fig. 2, the finger is drawn easily from above the nut being tapped, and at the termination of such downward movement is again forced by the spring $j'$ to its normal position.

In Figs. 1 and 10 I show a gate K, adapted to be slid across the lower end of the chute H' to prevent the feeding of the nut-blanks onto the anvil. It consists, essentially, of a bar $k'$, having a blade $k^2$, and is adapted to be slid in bearings $k^3$ and $k^4$ on the tapping-box support.

L is a feeding-cylinder which is preferably cylindrical in form and adapted to rotate in the hopper by means of a bevel-gear $l'$, which meshes into a pinion $l^2$ upon a shaft $l^3$, which shaft is adapted to receive rotation at intervals from the main shaft B in any suitable way. The feeding-cylinder L has an aperture therein through which the nuts drop from the hopper. In its revolution the aperture is preceded by a plow-shaped projection $l^4$ upon the outside of the feeding-cylinder which moves the nuts from the bottom of the hopper and away from the said cylinder, so as to change their position and enable some of them to drop through the aperture. The nut-blanks, being loosely and promiscuously thrown into the hopper, are fed in uneven quantities through the aperture in the cylinder because their position relative to the said cylinder is being constantly changed. A plate $l^5$ projects partly over the lower end of the cylinder through which the nuts drop, which plate serves to break their fall and deflects them into the upper end of the chute H'. The part L has been designated as a "feeding-cylinder," but it is obvious that it may be of any suitable form and perform its function in substantially the manner herein shown. The chute is of such shape that when the blanks reach the lower end they will assume the position shown in Fig. 1.

The preferred manner in which the feeding-cylinder L is given an intermittent rotation will now be described. Upon the outer end of the shaft $l^3$ is a clutch-sleeve M, which is connected to the said shaft by means of a pin $m$, that goes through the said shaft, projecting into slots $m'$ in the sleeve M. In the inner end of the sleeve is a projection, preferably the hardened point of a set-screw $m^2$, which normally projects into a radial groove in the hub of a constantly-revolving wheel N. The end of the hub of this wheel has projections $n$ and $n'$, into the path of which the projection $m^2$ can be moved by sliding the clutch-sleeve M outwardly, so that it will be caused to move with the constantly-rotating wheel N. The wheel N may receive rotation by means of a belt from the main shaft or by any convenient means.

O is a tappet secured to the joint at the upper end of the part G or to any other moving part of the machine.

A forked lever O', pivoted conveniently upon the main frame, its forked end engaging a radial groove in the clutch-sleeve M, serves as means to move the said clutch-sleeve in and out of engagement with the constantly-revolving wheel N.

Upon the lever O' is an arm $o'$, terminating in an antifriction-roller which projects into the path of the tappet O.

An arm P, conveniently bent to serve its purpose, is secured to the lever O' and rests upon the nut-blanks in the lower end of the chute when the said lever is not in contact with the tappet O. A spring $p$ presses this arm downward, so that when the blanks have been one by one fed to the tap and away from the arm P it will cause the said arm to drop and throw the clutch-sleeve M into engagement with the wheel N, thereby causing the hopper-feeding device L to revolve and feed down more blanks. The nut-blanks in the chute normally hold the clutch out of engagement by holding up the arm P against the slight pressure of the spring $p$. At each reciprocation of the tappet the pressure of the arm P upon the nut-blanks is relieved for a period of time sufficient to allow the blanks to slide down the chute and force a succeeding blank onto the anvil F. When the last blank has passed the arm P, the clutch-sleeve will be allowed to reëngage the shaft, because the spring $p$, pressing upon the arm P, forces the sleeve M into engagement. The center L of the hopper will then be rotated and will allow a new supply of nuts to fall into the chute and at the succeeding reciprocation of the tappet O will be stopped, as above described. In this manner it will be seen that the supply of nut-blanks in the lower end of the chute will control the movement of the center of the feeding-hopper, or, in other words, control the supply of blanks.

The aperture $L^2$ is made adjustable in size to suit nuts of different sizes by means of slide $l^{10}$, having a stem $l^{11}$, which is secured adjustably to the arm $l^{12}$ upon the cylinder L. The stem is shown as being secured to the arm $l^{12}$ by nuts $l^{13}$, the said stem having a thread cut thereon whereby the slide can be adjusted across the aperture $L^2$; but it will be understood that any convenient means can be used to make the required adjustment.

A chute-clearing device R is shown in Figs. 5 and 6. At one side of the chute and secured to the main frame conveniently is a bracket R', upon which the clearer is adapted to be reciprocated. The clearer consists of two parts, one a block $r$, sliding upon the arm R', and the other a plate $r^2$, hinged to the said block and having an oval cup $r^3$ depending therefrom into the chute. A set-screw $R^2$ upon the plate $r^2$ forms means to adjust the said plate to and from the block R upon the hinges, in order that the depending cup $r^3$ may be adjusted to and from the bottom of the chute to suit nuts of different sizes. The shape of the cup $r^3$ may be varied to suit the various conditions under which it may be used. It is caused to reciprocate in the chute by means of the bell-crank Q, pivoted upon the main frame, which has an arm $q$, adapted to engage a projecting pin upon the anvil-moving device or any other moving part of the machine. The other arm of the bell-crank, $q'$, is connected to the block $r$ by a pitman $q^2$, the plate $r^2$ being hinged to the block upon which it is supported and is allowed to float upon or raise from the nuts in the upper end of the chute as they are fed from the hopper, if in too large quantities.

The chuck D will now be described.

The lower end of the tap-spindle C is enlarged and has a transverse slot $d'$ cut therein. At the upper end of the slot a hole $d^2$ is drilled, preferably concentrically with the said spindle. A block or stationary tap-jaw $D^2$, having a pin $d^3$, lies in the said slot, the said pin fitting into the hole $d^2$. Upon the inner edge of the said block at its lower end is a semicircular seat for the tap-stem $e$. A spring-jaw $D^3$ lies in the slot $d'$, its upper end engaging an aperture $d^4$ in the block $D^2$ and its lower end adapted to engage a transverse depression $e'$ in the tap-stem. The tap-stem can be clamped between the stationary jaw $D^2$ and the spring-jaw $D^3$ by moving the sliding collar $D^4$ downward to the position shown in Fig. 8. A cam-block $d^5$ fits in the slot $d'$ and is held upon the collar $D^4$ by the lugs $d^6$ and set-screw $d^7$. Its inner edge is cam-shaped, so as to force the spring-jaw $D^3$ toward the tap-stem when in its lower position. When the collar is raised, the shape of the block $d^5$ is such that the spring-jaw $D^3$ is relieved and springs away from the tap-stem. The collar $D^4$ is moved from one position to the other by the hand-lever D', pivoted upon the slide $G^2$ and carrying the lugs $d^{12}$, pivoted thereon, that engage the circumferential groove $d^8$ in the said collar. By these means the tap can be taken out and rechucked without stopping the tap-spindle. A plate $d^{10}$ is secured to the part $d$ of the spindle by the set-screw $d^{11}$ and serves to hold the various parts of the chuck in their proper position.

In regard to the clearing device, as shown and described, it is of the most preferable form, but it will be understood that its function is to move toward the upper end of the chute in order to keep that part from being clogged by nut-blanks, and I shall so draw some of my claims as to cover, broadly, a moving clearing device in combination with the chute of a tapping-machine.

What I claim as my invention, and desire to secure by Letters Patent, is—

1. In a nut-tapping machine, the combination of a hopper into which the blanks are promiscuously thrown, and the chute down which the said blanks slide to the tapping-spindle, with a hollow cylinder L adapted to be rotated and having an aperture $L^2$ through which the said blanks fall from said hopper into said chute, substantially as described.

2. In a nut-tapping machine, a hopper, a feeding device adapted to be moved to feed the nut-blanks from said hopper, a chute adapted to receive the said blanks from said device, and means adapted to allow said feeding device to be intermittently moved, said means having a lever adapted to be prevented from dropping to move said feeding device, by the nut-blanks lying thereunder in the said chute, and to be permitted to drop when said nut-blanks move past it, substantially as described.

3. In a nut-tapping machine and in combination with the tapping-spindle, the tap, the tapping-box and the chute down which nut-blanks slide to the said tapping-box with a hopper, a feeding device revolving upon a substantially vertical axis in said hopper and having an aperture through which the nut-blanks drop from the said hopper to the said tapping-box, substantially as described.

4. In a nut-tapping machine the combination of a hopper, a feeding device revolving therein and having an opening through which the nut-blanks fall, and means for making said opening adjustable so as to limit the number of nut-blanks falling therethrough, substantially as described.

5. In a nut-tapper and in combination with the hopper, a feeding device revolving in said hopper and having a plow-shaped projection on its periphery and an aperture through which the nuts may fall, substantially as described.

6. In a nut-tapping machine, and in combination with the tapping-spindle and associated devices, a chute down which the nut-blanks slide, a hopper, a feeding device adapted to be intermittently moved to feed the said blanks into said chute, a constantly-revolving wheel, a clutch adapted to connect said wheel with said feeding device and a lever adapted to rest upon the nut-blanks in the said chute and hold said clutch disengaged, and to fall when said nut-blanks have passed beyond it, and thus throw the said clutch into engagement with the said wheel, whereby said feeding device is intermittently moved to maintain a supply of nuts in said chute, substantially as described.

7. In a nut-tapping machine, and in combination with the tapping-spindle and associated devices, a chute down which the nut-blanks slide, a hopper, a feeding device adapted to be intermittently moved to feed the said blanks into said chute, a constantly-revolving wheel, a clutch adapted to connect said wheel with said feeding device and a lever adapted to rest upon the nut-blanks in the lower end of the chute and hold said clutch disengaged and to fall when said nut-blanks have passed beyond it, and thus throw the said clutch into engagement with the said wheel, whereby said feeding device is intermittently moved to maintain a supply of nuts in said chute, and a tappet carried by a moving part of the machine and adapted to disengage the clutching mechanism, substantially as described.

8. In a nut-tapping machine and in combination with the constantly-revolving tapping-spindle and a reciprocating anvil adapted to feed nut-blanks to the tap, a spring presser-finger adapted to prevent the said nut-blanks from getting out of place upon said anvil and operating substantially as and for the purpose described.

9. The combination of the tap-spindle having an enlarged end in which is a transverse slot $d'$, the stationary jaw $D^2$, the spring-jaw $D^3$, a clamping-block $d^5$, a sliding collar $d^4$ carrying said clamping-block, and means for operating the same, substantially as described.

10. In a nut-tapping machine, the combination of a revolving tap, a nut-blank-feeding device adapted to move to and from said tap and a shuttle pivoted to said feeding device and adapted to form with the said device an inclosure into which the blank to be operated upon is delivered, said shuttle having a cam-shaped surface and a stationary spring adapted to press against said surface when said feeding device and shuttle are in their blank-receiving position, substantially as and for the purpose described.

11. In a nut-tapping machine the combination of a chute down which the nut-blanks may slide by means of the aid of gravity, with a clearing device hinged to a moving support and adapted to prevent the said blanks from becoming clogged in said chute, substantially as described.

12. In a nut-tapping machine the combination of a chute into which the nut-blanks drop without regard to their relative positions and down which they slide by means of the aid of gravity, with a moving clearing device hinged to its support so as to yieldingly float upon the nut-blanks and free them one from another, substantially as described.

13. In a nut-tapping machine the combination of a chute down which the nut-blanks are dropped without regard to their relative positions and down which they slide by means of the aid of gravity, with a reciprocating clearing device overhanging said chute and hinged to its support, substantially as and for the purpose described.

14. In a nut-tapping machine, the combination of a chute with a clearing device reaching into said chute, a support to which said device is hinged, means for limiting the distance between said device and said chute and means for giving the desired movement to said support, substantially as described.

JAMES A. PLOPPER.

Witnesses:
ARTHUR JOHNSON,
LOUIS O. HENSSLER.